US012226361B2

(12) United States Patent
Manwaring et al.

(10) Patent No.: US 12,226,361 B2
(45) Date of Patent: Feb. 18, 2025

(54) DEVICE AND METHOD TO INDUCE INTERFERENTIAL BEAT VIBRATIONS AND FREQUENCIES INTO THE BODY

(71) Applicant: The Chair Fix LLC, Orem, UT (US)

(72) Inventors: Kim H. Manwaring, Heber, UT (US); Jonathon D. Blotter, Heber, UT (US); Scott C. Steffensen, Provo, UT (US); Kyle B. Bills, Provo, UT (US); Jordan T. Yorgason, Provo, UT (US)

(73) Assignee: THE CHAIR FIX LLC, Orem, UT (US)

( * ) Notice: Subject to any disclaimer, the term of this patent is extended or adjusted under 35 U.S.C. 154(b) by 0 days.

(21) Appl. No.: 17/437,386

(22) PCT Filed: Apr. 23, 2020

(86) PCT No.: PCT/US2020/029626

§ 371 (c)(1),
(2) Date: Sep. 8, 2021

(87) PCT Pub. No.: WO2020/186274

PCT Pub. Date: Sep. 17, 2020

(65) Prior Publication Data

US 2022/0183925 A1 Jun. 16, 2022

Related U.S. Application Data

(60) Provisional application No. 62/863,160, filed on Jun. 18, 2019, provisional application No. 62/837,638, (Continued)

(51) Int. Cl.

| | |
|---|---|
| ***A61H 23/02*** | (2006.01) |
| ***A61H 1/00*** | (2006.01) |
| *A61H 23/00* | (2006.01) |

(52) U.S. Cl.

CPC ......... *A61H 23/0245* (2013.01); *A61H 1/005* (2013.01); *A61H 23/02* (2013.01); (Continued)

(58) Field of Classification Search

CPC ........ A61H 1/001; A61H 1/005; A61H 7/001; A61H 15/0078; A61H 15/02; (Continued)

(56) References Cited

U.S. PATENT DOCUMENTS 4,105,024 A * 8/1978 Raffel .................. A61H 9/0078 5/915
4,570,616 A * 2/1986 Kunz ................ A61H 23/0263 74/61
(Continued)

FOREIGN PATENT DOCUMENTS

CN 107468499 A * 12/2017
EP 1688119 A1 * 8/2006
(Continued)

OTHER PUBLICATIONS

Cambridge Dictionary, Definition of Stereo, 2022. (Year: 2022).*
(Continued)

*Primary Examiner* — Tu A Vo
(74) *Attorney, Agent, or Firm* — Workman Nydegger

(57) ABSTRACT

A system and method adapted to introduce vibrational waves into a body of a subject includes first and second vibration contacts and first and second vibration sources. The system and method are useful for the relief and symptoms of distress including pain and anxiety and more specifically to addiction withdrawal.

16 Claims, 11 Drawing Sheets

Related U.S. Application Data filed on Apr. 23, 2019, provisional application No. 62/815,981, filed on Mar. 8, 2019.

(52) U.S. Cl.
CPC .................. *A61H 2023/002* (2013.01); *A61H 2023/0209* (2013.01); *A61H 2201/0138* (2013.01); *A61H 2201/0149* (2013.01); *A61H 2201/1207* (2013.01); *A61H 2201/1633* (2013.01); *A61H 2201/165* (2013.01); *A61H 2201/5002* (2013.01); *A61H 2201/5005* (2013.01); *A61H 2201/5043* (2013.01); *A61H 2201/5048* (2013.01); *A61H 2201/5058* (2013.01); *A61H 2201/5061* (2013.01); *A61H 2201/5079* (2013.01); *A61H 2201/5084* (2013.01); *A61H 2203/0425* (2013.01); *A61H 2203/0431* (2013.01); *A61H 2205/086* (2013.01)

(58) Field of Classification Search
CPC ...... A61H 2023/002; A61H 2023/0209; A61H 23/02; A61H 2201/0138; A61H 2201/0149; A61H 2201/10; A61H 2201/1207; A61H 2201/1633; A61H 2201/1645; A61H 2201/165; A61H 2201/5002; A61H 2201/5005; A61H 2201/5007; A61H 2201/5035; A61H 2201/5061; A61H 2203/0425; A61H 2203/0431; A61H 2205/086; A61H 2230/605; A61H 23/00; A61H 23/006; A61H 23/0218; A61H 23/0236–0263; A61H 2023/0227; A61H 2023/0272–029; A61H 2201/0142–0146; A47K 13/00; A47K 13/24; A47C 16/008; A47C 21/006; B62B 9/22; B60N 2/976; B60N 2002/981; A61F 5/56; A61F 5/566; A61F 2005/563
USPC .......................................................... 601/57
See application file for complete search history.

(56) References Cited

U.S. PATENT DOCUMENTS 4,920,583 A * 5/1990 Hough .................. A47K 13/24 4/234
5,020,518 A * 6/1991 Spears ............... A61H 15/0078 601/102
5,857,986 A * 1/1999 Moriyasu ............... A61H 23/02 601/57
6,087,942 A * 7/2000 Sleichter, III .......... G08B 21/06 340/576
6,319,213 B1 * 11/2001 Tomac ..................... A61H 1/00 601/53
7,311,681 B1 * 12/2007 Vaccarella ......... A61H 23/0263 601/49
7,553,288 B2 * 6/2009 Cohen ...................... H04R 5/04 601/48
7,614,099 B2 * 11/2009 Goetz .................. A61M 21/02 5/413 R
7,771,375 B2 * 8/2010 Nishibori ............. A47C 21/003 5/915
9,457,166 B1 10/2016 Lasorso, Jr.
9,549,867 B1 * 1/2017 El-Messeiry ............ A61H 7/00
9,943,461 B1 * 4/2018 Muench ............... A61H 31/006
2002/0183667 A1 * 12/2002 Kitadou ............... A47C 21/006 601/91
2003/0060741 A1 * 3/2003 Park .................. A61H 23/0218 601/20
2005/0054958 A1 * 3/2005 Hoffmann ............ A61B 17/225 977/905
2008/0070752 A1 * 3/2008 Einav ............... A63B 21/00181 482/7
2008/0195007 A1 8/2008 Podrazhansky et al.
2009/0250982 A1 10/2009 Cohen
2010/0036297 A1 * 2/2010 Kim .................. A61H 23/0236 601/49
2010/0265090 A1 * 10/2010 Bisset .................... A47C 7/725 340/573.7
2011/0028869 A1 * 2/2011 Imai ...................... A61H 1/005 601/5
2012/0022348 A1 1/2012 Droitcour et al.
2013/0210577 A1 * 8/2013 Ceoldo ............. A63B 21/4035 482/1
2013/0281897 A1 * 10/2013 Hoffmann ............. A61H 23/00 601/107
2013/0345602 A1 * 12/2013 Yang ...................... A61H 23/00 601/1
2014/0018713 A1 * 1/2014 Elenga ............... A61H 23/0218 601/78
2014/0058288 A1 * 2/2014 Bartol .................... A61B 5/227 600/595
2015/0173669 A1 * 6/2015 Simon .................... G16H 50/20 600/595
2015/0182418 A1 * 7/2015 Zaiss ...................... A61H 1/005 601/57
2015/0305975 A1 * 10/2015 Maffei .................. A47C 1/143 601/56
2017/0182324 A1 6/2017 Carroll
2017/0333005 A1 11/2017 Chen et al.
2017/0348180 A1 * 12/2017 Inada ................ A61H 15/0078
2018/0036198 A1 * 2/2018 Mergl .................... B60N 2/501
2018/0042627 A1 2/2018 Gilstad et al.
2018/0200519 A1 7/2018 Walker et al.
2019/0105517 A1 4/2019 Tyler
2019/0299832 A1 * 10/2019 Uenal .................... B60N 2/976
2020/0085673 A1 * 3/2020 Seo ...................... A61B 5/4836
2020/0246579 A1 * 8/2020 Cohen .................... A61H 23/02
2020/0330322 A1 * 10/2020 Kang ................ A61H 15/0078

FOREIGN PATENT DOCUMENTS

GB 2342103 A * 4/2000
KR 100757294 B1 * 2/2007

OTHER PUBLICATIONS

Virtins Technology, "Multi-Instrument—Spectrum 3D Plot," Jan. 22, 2016. (Year: 2016).*
Written Opinion issued on Aug. 10, 2020, in PCT/US2020/29626.
International Search Report issued on Aug. 10, 2020, in PCT/US2020/29626.
Koob, George F.; "Dopamine, addiction and reward"; Seminars in The Neurosciences; 1992; vol. 4; pp. 139-148.
Schultz, Wolfram, et al.; "A Neural Substrate of Prediction and Reward"; Science ; Mar. 14, 1997; New Series; vol. 275, No. 5306; pp. 1593-1599.
Phillips, Anthony G., et al.; "Amygdalar control of the mesocorticolimbic dopamine system: parallel pathways to motivated behavior"; Neuroscience and Biobehavioral Reviews; 2003; 27; pp. 543-554.
Agmo, Anders, et al. ; "Reward and Reinforcement Produced by Drinking Sucrose: Two Processes That May Depend on Different Neurotransmitters"; Pharmacology Biochemistry and Behavior; 1995; vol. 52, No. 2; pp. 403-414.
Oleson, Erik B. ,et al.; "Subsecond Dopamine Release in the Nucleus Accumbens Predicts Conditioned Punishment and its Successful Avoidance"; The Journal of Neuroscience; Oct. 17, 2012; 32(42); pp. 14804 -14808.
Howe, Mark W.; "Prolonged dopamine signalling in striatum signals proximity and value of distant rewards"; Nature; Research Letter; Aug. 29, 213; vol. 500; pp. 575-590; doi:10.1038/nature12475.

(56) References Cited

OTHER PUBLICATIONS

Schultz, Wolfram, et al.; "Responses of Monkey Dopamine Neurons to Reward and Conditioned Stimuli during Successive Steps of Learning a Delayed Response Task"; The Journal of Neuroscience; Mar. 1993; 13(3); pp. 900-913.
Di Chiara, Gaetano, et al.; "Drugs abused by humans preferentially increase synaptic dopamine concentrations in the mesolimbic system of freely moving rats"; Neurobiology; Proc. Natl. Acad. Sci.; Jul. 1988; vol. 85; pp. 5274-5278.
Le Moal, Michel, et al.; "Drug addiction: Pathways to the disease and pathophysiological perspectives"; European Neuropsychopharmacology; 2007; 17; pp. 377-393.
Koob, George F., et al.; "Neurocircuitry of Addiction"; Neuropsychopharmacology Reviews; 2010; 35; pp. 217-238.
Koob, George F., et al.; "Neurobiology of addiction: a neurocircuitry analysis"; Lancet Psychiatry; Aug. 2016; 3(8); pp. 760-773; doi:10.1016/S2215-0366(16)00104-8.
Imperato, Assunta, et al.; "Dopamine Release and Metabolism in Awake Rats After Systemic Neuroleptics as Studied by Trans-Striatal Dialysis"; The Journal of Neuroscience; Feb. 1985; vol. 5, No. 2; pp. 297-306.
Yim, Hyeon Joo, et al.; "Ethanol-induced increases in dopamine extracellular concentration in rat nucleus accumbens are accounted for by increased release and not uptake inhibition"; Alcohol; 2000; 22; pp. 107-115.
Weiss, Friedbert, et al.; "Ethanol Self-Administration Restores Withdrawal-Associated Deficiencies in Accumbal Dopamine and 5-Hydroxytryptamine Release in Dependent Rats"; The Journal of Neuroscience; May 15, 1996; 16(10); pp. 3474-3485.
Nestler, Eric J.; "Psychogenomics: Opportunities for Understanding Addiction"; The Journal of Neuroscience; Nov. 1, 2001; 21(21); pp. 8324-8327.
Kalivas, Peter W., et al.; "The Neural Basis of Addiction: A Pathology of Motivation and Choice"; Am J Psychiatry; Aug. 2005; 162:8; pp. 1403-1413.
Marco, Diana, et al.; "Crucial Role of Acetaldehyde in Alcohol Activation of the Mesolimbic Dopamine System"; Ann. N. Y. Acad. Sci. 1139: 307-317 (2008). 2008 New York Academy of Sciences; doi: 10.1196/annals.1432.009.
Steffensen, Scott C., et al.; "Cocaine disinhibits dopamine neurons in the ventral tegmental area via use-dependent plockade of GABA neuron voltage-sensitive sodium channels"; European Journal of Neuroscience; 2008; vol. 28; pp. 2028-2040; doi:10.1111/j.1460-9568.2008.06479.x.
Olsson, Sara K., et al.; "Elevated levels of kynurenic acid change the dopaminergic response to amphetamine: Implications for schizophrenia"; International Journal of Neuropsychopharmacology; 2009; 12; pp. 501-512; doi:10.1017/S1461145708009383.
Hyman, Steven E., et al.; "Addiction and the Brain: the Neurobiology of Compulsion and its Persistence"; Neuroscience; Nature Reviews; Oct. 2001; vol. 2; pp. 695-703.
Hyman, Steve E., et al.; "Neural Mechanisms of Addiction: The Role of Reward-Related Learning and Memory"; Neural Mechanisms of Addiction; Annu. Rev. Neurosci. 2006.29:565-598. Downloaded from www.annualreviews.org.
Nugent, Fereshteh S., et al.; "LTP of GABAergic synapses in the ventral tegmental area and beyond"; J Physiol; 2008; 586.6; pp. 1487-1493.
Piper, Megan E., et al.; "Anxiety Diagnoses in Smokers Seeking Cessation Treatment: Relations with Tobacco Dependence, Withdrawal, Outcome, and Response to Treatment"; Addiction; Feb. 2011; 106(2); pp. 418-427; doi:10.1111/j.1360-0443.2010.03173.x.
Bills, Kyle B., et al.; "Targeted Subcutaneous Vibration With Single-Neuron Electrophysiology as a Novel Method for Understanding the Central Effects of Peripheral Vibrational Therapy in a Rodent Model"; Dose-Response: An International Journal; Jan.-Mar. 2019; pp. 1-7.
Martorell, Anthony J., et al.; "Multi-sensory Gamma Stimulation Ameliorates Alzheimer's-Associated Pathology and Improves Cognition"; Cell; Apr. 4, 2019; 177; pp. 256-271; https://doi.org/10.1016/j.cell.2019.02.014.
Clements-Cortes A, Ahonen H, Evans M, Freedman M, Bartel L (2016). Journal of Alzheimer's Disease, 52(2), 651-660. DOI 10.3233/JAD-160081. ref Ko et al.
International Preliminary Report on Patentability received for PCT Patent Application No. PCT/US2020/029626, mailed on Sep. 23, 2021, 07 pages.

* cited by examiner

DEVICE AND METHOD TO INDUCE INTERFERENTIAL BEAT VIBRATIONS AND FREQUENCIES INTO THE BODY

CROSS REFERENCE TO RELATED APPLICATIONS

This application claims the benefit of U.S. Provisional Application No. 62/815,981, filed Mar. 8, 2019, U.S. Provisional Application No. 62/837,638, filed Apr. 23, 2019, and U.S. Provisional Application No. 62/863,160, filed Jun. 18, 2019, the contents of which are hereby incorporated by reference.

REFERENCE TO EARLIER FILED APPLICATIONS

This application is a 371 national phase of PCT/US2020/029626, filed Apr. 23, 2020, and claims the benefit of U.S. Provisional Application No. 62/815,981, filed Mar. 8, 2019, U.S. Provisional Application No. 62/837,638, filed Apr. 23, 2019, and U.S. Provisional Application No. 62/863,160, filed Jun. 18, 2019, the contents of which are hereby incorporated by reference.

This invention was made with government support under Grant Numbers AA020919, DA035958 and F32AT009945 awarded by the National Institutes of Health. The government has certain rights in the invention.

BACKGROUND

Dopamine (DA) functions as a neurotransmitter and hormone in humans and a wide variety of vertebrates and invertebrates. It is associated with emotional behavior, cognition, voluntary movement, motivation, punishment, and reward. Dopamine is produced in several brain areas, including the midbrain substrantia nigra (SN), VTA, and hypothalamus. The primary function of the midbrain SN DA system, termed the nigrostriatal system, is for initiating and terminating planned movement and involves DA neurons that project to the dorsal striatum; the VTA DA system, termed the mesolimbic system, is for motivation and involves DA neurons that originate in the midbrain VTA and project to the ventral striatum, otherwise known as the nucleus accumbens (NAc); and the hypothalamic DA system, whose function is to inhibit the release of prolactin from the anterior lobe of the pituitary. The nigrostriatal and mesolimbic DA systems exhibit analogous neurons, circuits, neurotransmitters, and receptors. The mesolimbic DA system (Koob, 1992; Bloom, 1993; Kalivas et al., 1993; Schultz et al., 1997) constitutes part of the brain reward system that has evolved for mediating natural motivated behaviors such as feeding (Phillips et al., 2003), drinking (Agmo et al., 1995), and drug reward [including alcohol reward (Koob, 1996)]. There is considerable evidence demonstrating that DA release in the NAc induces a motivational drive and that the DA signal is modulated by past experience of reward and punishment (Oleson et al., 2012; Howe et al., 2013). Mesolimbic DA is believed to be a teaching signal which codes the magnitude of aversive and rewarding stimuli (Howe et al., 2013). The mesolimbic dopamine (DA) circuit originates in the ventral tegmental area (VTA) of the midbrain and terminates in the nucleus accumbens (NAc) of the striatum. Dopamine release within the mesolimbic circuit has been implicated in both associative learning and motivation (Schultz, Apicella, & Ljungberg, 1993; Wise, 2004). Preferential increases in DA release within the NAc are a hallmark of drugs of abuse (Di Chiara & Imperato, 1988), literally a scalar index of reward, suggesting that the abuse potential of a drug is tied to its ability to increase DA release within the NAc. The prevailing view is that drugs are initially consumed for their positive reinforcing properties, but that over time the maintenance of drug seeking is driven by the ability of the drug to alleviate the symptoms of withdrawal (Koob, 2014; Koob & Le Moal, 1997; Koob & Volkow, 2010, 2016). This progression from positive to negative reinforcement is, at least in part, the result of changes within the mesolimbic DA system. Acute administration of most drugs of abuse increase DA release in the NAc (Di Chiara & Imperato, 1985; Imperato & Di Chiara, 1986; Yim & Gonzales, 2000) whereas chronic consumption results in a protracted decrease in NAc DA levels during withdrawal (Weiss et al., 1996). This protracted decrease in NAc DA levels creates a anhedonic state in which individuals are more likely to seek out and consume drugs to increase DA levels in the NAc and thus diminish the feelings of dysphoria. This is often referred to as the negative reinforcement properties of ethanol, or the "dark side" of addiction.

Dysregulated DA transmission has been implicated in the allostatic properties of drugs of abuse (Wise, 2004). The dogma is that any drug or behavior that increases midbrain DA neuron activity will be rewarding, and potentially addictive (Kalivas et al., 1993; Nestler, 2001; Kalivas & Volkow, 2005). However, the neurobiology of the addiction process certainly involves multiple, complex neural circuits including the mesolimbic DA system (Diana et al., 2008; Steffensen et al., 2008; Olsson et al., 2009; 2009). Notwithstanding the complexity, the prevailing view is that people consume drugs for their rewarding properties, which are mediated by this system. Drugs enhance DA release resulting in feelings of pleasure, euphoria, and well-being. The level of DA release by some drugs of abuse can be 10 times that produced by natural rewarding behaviors such as eating, drinking, and sex. However, the onslaught of DA release is transient and often results in adaptations including progressive, compensatory lowering of baseline DA levels. Addicts continue their cycle of abuse, in part, as a result of maladapted and depleted DA levels, resulting in feelings of anxiety and dysphoria that drives subsequent drug-seeking behavior. Although this model seems straightforward in concept, it is likely over-simplistic in scope, as DA release may only be one determinant of addiction, as the DA projection from the VTA to the NAc is only part of a larger motivational circuit that includes cortical and subcortical structures. Indeed, modifications in DA release may be an epiphenomenon of a larger maladaptive process involving multiple neuronal substrates and inputs. Regardless, tolerance accrues to repeated drug use, resulting ultimately in persistently lowered DA release in the NAc. Although addiction begins as a personal choice to consume a drug or other reinforcer, the motivation to continue to seek the reinforcing stimulus is influenced greatly by genetic, environmental and experiential factors, leading to a spiraling dysregulation of brain DA with intermittent exposure to the reinforcer. The emerging view is that the impaired homeostasis that accompanies the development of drug addiction may result from experience-dependent neuroadaptations that usurp normal synaptic transmission in this system (Hyman & Malenka, 2001; Hyman et al., 2006; Kauer & Malenka, 2007; Nugent & Kauer, 2008). This maladapted state is associated psychologically with anxiety and behaviorally with drug-seeking behavior. The severity of associated symptoms and signs can for some drugs of abuse like alcohol can be life-threatening and the re-dosing behavior can frequently lead to overdose and death. The addicting substances are typically nonspecific in stimulation and may also include overstimulation of selective central receptors in the pain pathway among others.

BRIEF SUMMARY

In the clinical management of addiction, various strategies to mitigate withdrawal symptoms are employed until the patient no longer experiences the craving and the symptoms have fully subsided. This may involve methods of titration, substitution, and even aversion. Among all of these approaches, signaling of anxiety as a subjective perception of worry, unease, and nervousness is a prodrome which must be ameliorated (Piper et al., 2011). Sometimes prescription drugs, for example in the benzodiazepine class, can mitigate this mind state. Multiple ancillary strategies have been showed to benefit, including acupuncture, yoga, hypnosis, and psychotherapy. However, it is apparent that intervention must be readily available, including the home environment, to be an effective bridge.

Bills, Steffensen et al (Bills et al., 2019) have recently showed in a mouse model that the central pathway of stimulation resulting in dopamine release can be controllably activated by peripheral mechanoreceptor stimulation, in some implementations optimally in the range of 45-80 Hz and predominantly at receptors in the cervical spine region. Such stimulation causes release of dopamine in the NA with a prolonged duration of many minutes beyond cessation, the so-called afterglow effect. It is reasonable to hypothesize that such physical stimulation can function as a benign, repeatable bridge through symptoms and signs of withdrawal. As such, an on-demand availability of a device to which a patient can resort while in withdrawal could immediately ameliorate symptoms and signs, but specifically prevent progression beyond anxiety.

To this end, the inventors have developed a device and method for introducing vibrations to patient as a way to reduce symptoms and anxiety to a patient. The system may include vibration contacts to introduce vibration, each contact driven by a vibration source. A first vibration contact may be in mechanical communication with a first location of the body of the patient. A first vibration source may be connected to the first vibration contact and configured to cause a first vibration of the first vibration contact. A second vibration contact may be in mechanical communication with a second location of the body of the patient. A second vibration source may be connected to the second vibration contact and configured to cause a second vibration of the second vibration contact. The location or orientation of the first vibration contact and the second vibration contact may be configured such that the first vibration combines with the second vibration to generate a super-imposed vibration that travels along the spine of the patient.

In one particular implementation, the system include a self-centering, conforming seat similar to a deep pan tractor seat. The seat may be divided into two halves in the sagittal plane such that the center of contact weight in the seated position is directly beneath each ischial tuberosity. On the underside of each of the seat halves may be affixed two low frequency effect (LFE) transducers which can be independently driven with various frequencies, amplitudes, and waveform shapes. By this method, interferential beat frequencies in the therapeutic range interact to provide subjectively localized maxima in a traveling pattern which can be focused in the cervical spine. The patient experiences relief of anxiety and feelings of relaxation. The subjective relief endures for many minutes post stimulation. The induced, non-displacing vibration and beat effects can be quantified for duration and compliance of use in a treatment regimen.

Yet further, recent studies from Martorell and Tsai (Martorell et al., 2019) have suggested additive therapeutic effects when other sensory modalities have been employed in cognitive enhancement in an animal model of Alzheimer's disease. Similarly, Clements-Cortex (Clements-Cortes et al., 2016) has showed that rhythmic visual and auditory stimulation may be beneficial to cognitive function. In disclosed system and method, the tactile activation of mechanoreceptors by vibration may be augmented in the brain by similarly entrained pulses in the visual and auditory systems. The system and method have also been adapted to induce synchronized multi-modality sensory input into the brain, including differential frequencies to induce the beat effect.

DETAILED DESCRIPTION OF THE DRAWINGS AND THE PRESENTLY PREFERRED EMBODIMENTS

Figure 1A:
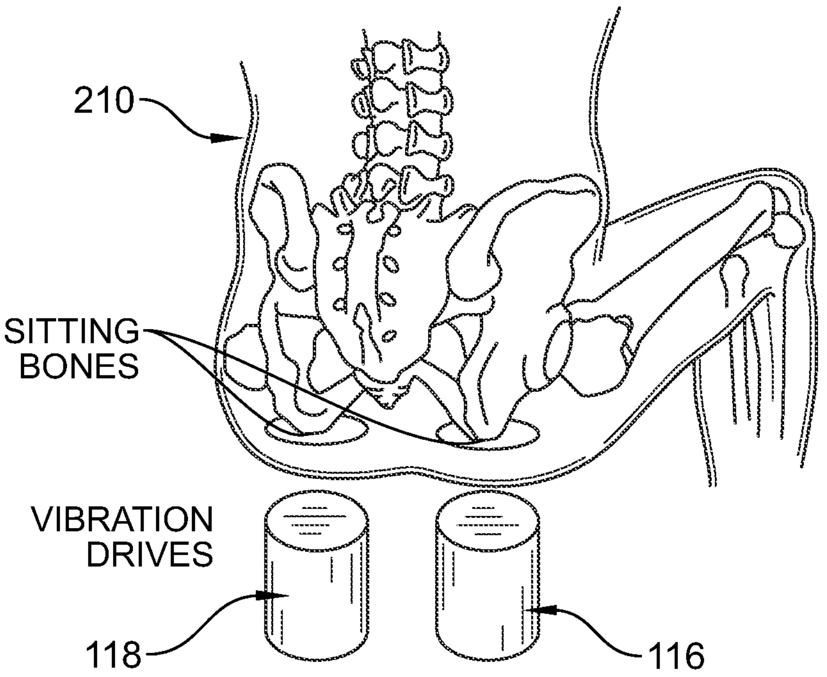
FIG. 1*a* is a posterior view of a seated subject on the vibration contacts with transducers directly beneath each ischial spine.

Turning now to FIG. 1*a*, a skeletal depiction of a seated subject upon a seat is illustrated. In this implementation, a first vibration contact 112 may be a first portion of a seat and a second vibration contact 114 may be a second portion of a seat. Although, it is understood that the vibration contacts could take the form of pad or plates that may be fixed in location and act to support the body. Further, the vibration contacts may be wearable or fastenable to the body through adhesive or a harness arrangement allowing the vibration contacts to move with the body. Each vibration contact (e.g. portion of the seat) may be independent from the other vibration contact (e.g. not attached) allowing each portion to vibrate independently from one another. As shown, the right ischial tuberosity may contact one portion of the seat and the left ischial tuberosity may contact the second portion of the seat. Beneath each ischial tuberosity of the pelvis, a first vibration source 116 may be connected to the first vibration contact 112 and a second vibration source 118 may be connected to the second vibration contact 114. In the example shown, the vibration sources may be a low frequency effects (LFE) transducer, although it is understood that other vibrations sources may be used, comprising comprise at least one of electromagnetic drivers, piezo-electric drivers, displacement shakers, solenoids, pneumatic or hydraulic actuators, and electric motors with unbalanced weights, cams, linear resonance actuators, piezoelectric actuators, or crankshafts. In some implementations, each vibration contact (e.g. each sagittal half of a seat) can be vibrated at the same frequency with 0° to 180° of relative phase. Each vibration contact can be vibrated at frequencies offset from each other such as to induce an interferential beat frequency as the difference between the two driving frequencies. In some implementations, each vibration contact (e.g. each sagittal half of a seat) can be vibrated with different frequencies. Each vibration contact can be vibrated independently with various waveforms in a range of 5-200 Hz to induce beat frequencies in the range of 0.05 Hz to 200 Hz which can be perceived as a traveling wave from pelvis to cranium. As such, each vibration contact can be vibrated independently to induce localized vibrational maxima into the head and/or cervical spine by use of phased inputs or beat frequencies. The vibration drives may also be such that the input vibration waves superimpose external to the body resulting in a beat frequency wave being directly input to the body.

Figure 1B:
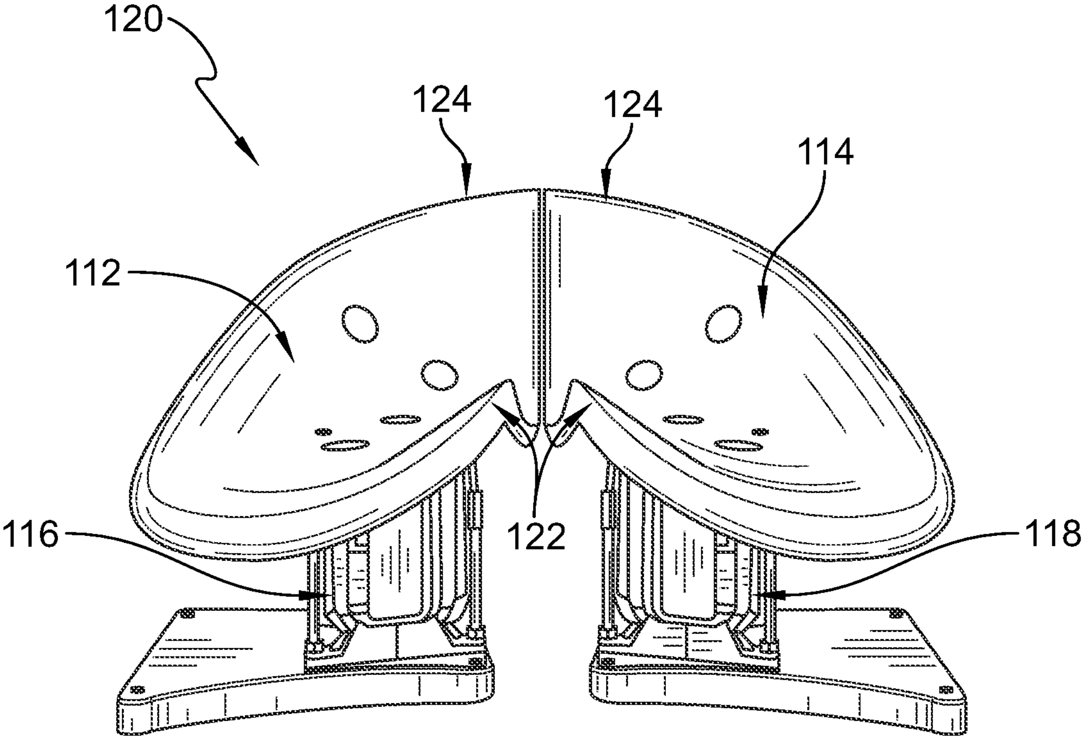
FIG. 1*b* is an anterior view of a seat with transducers affixed to each half of the seat.

FIG. 1*b* shows an anterior view of a self-centering deep pan seat 120 which has been divided into two halves (e.g. a first and second vibration contact 112, 114), each half resting on a LFE transducer (e.g. a first and second vibration source 116, 118). The self-centering deep pan seat 120 may also be referred to as a conforming, self-centering seat 120, a deep pan seat 120, and/or a conformal, dual-vibrating seat 120. The transducers may sit at an elevated height off the floor for a subject's normal seat height. The spacing between halves may be adjustable to assure the lateral thighs are snugly conformed by the deep pan. A raised surface 122 of the middle portion of the seat aids in self-centering the subject on the seat and providing alignment and contact of the subject's lateral thighs and spine to transmit the vibration to the subject from the seat. Further, a raised edge 124 around the outside of the seat forming the pan aids in centering and alignment, as well. The LFE transducers can induce vibration into the pelvis by the impulse movement of a vertically oriented magnetic piston which is controlled by a high current coil circumferentially wound. One exemplary vibration source may be the Buttkicker LFE Concert transducer which has an operating frequency range of 5-200 Hz (The Guitammer Company, Westerville, Ohio 43086).

Figure 2A:
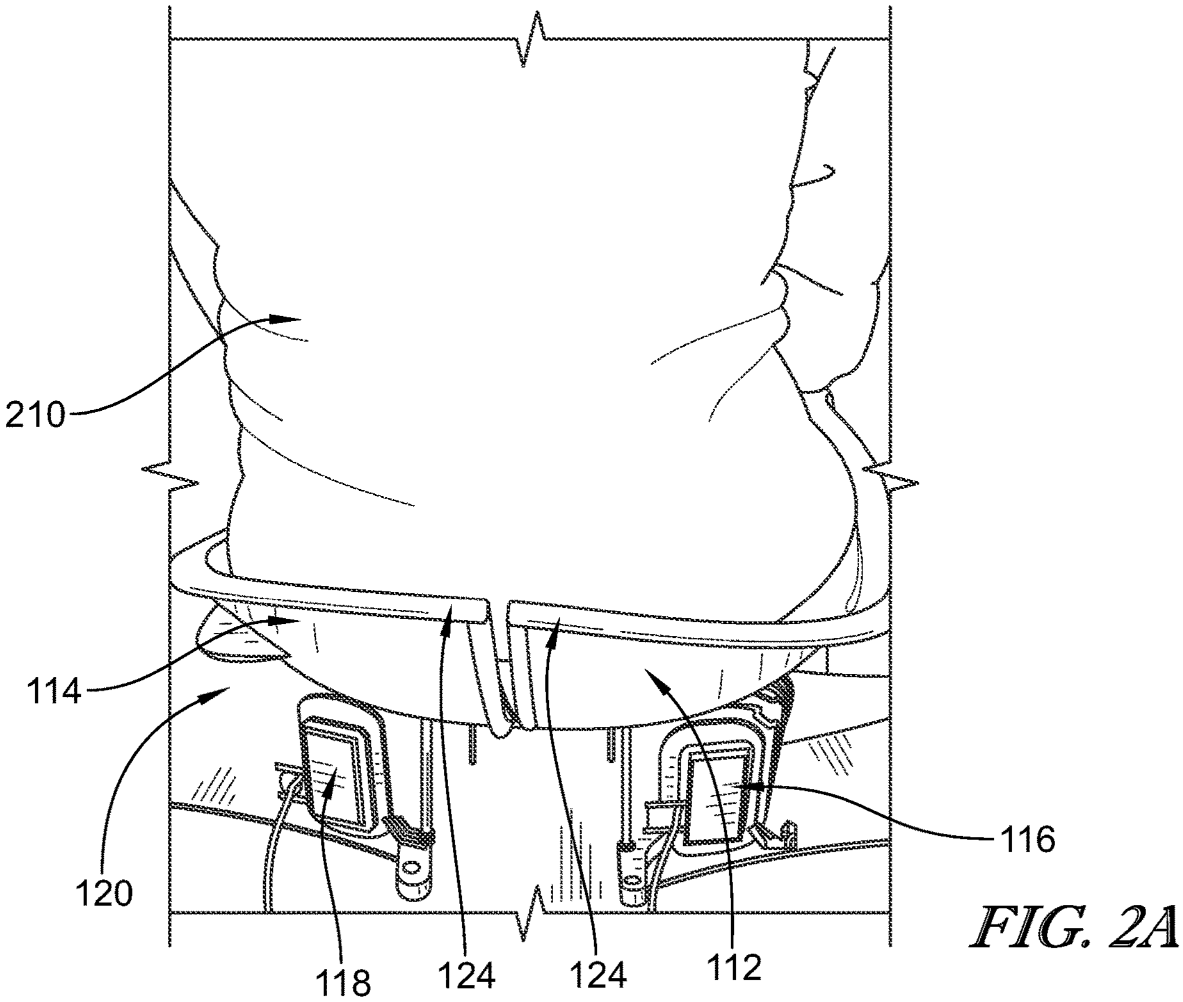
FIG. 2*a* is a posterior view of a seated subject with transducers positioned to transmit maximal vertical displacement vibration into the pelvis through separately controllable units.
Figure 2B:
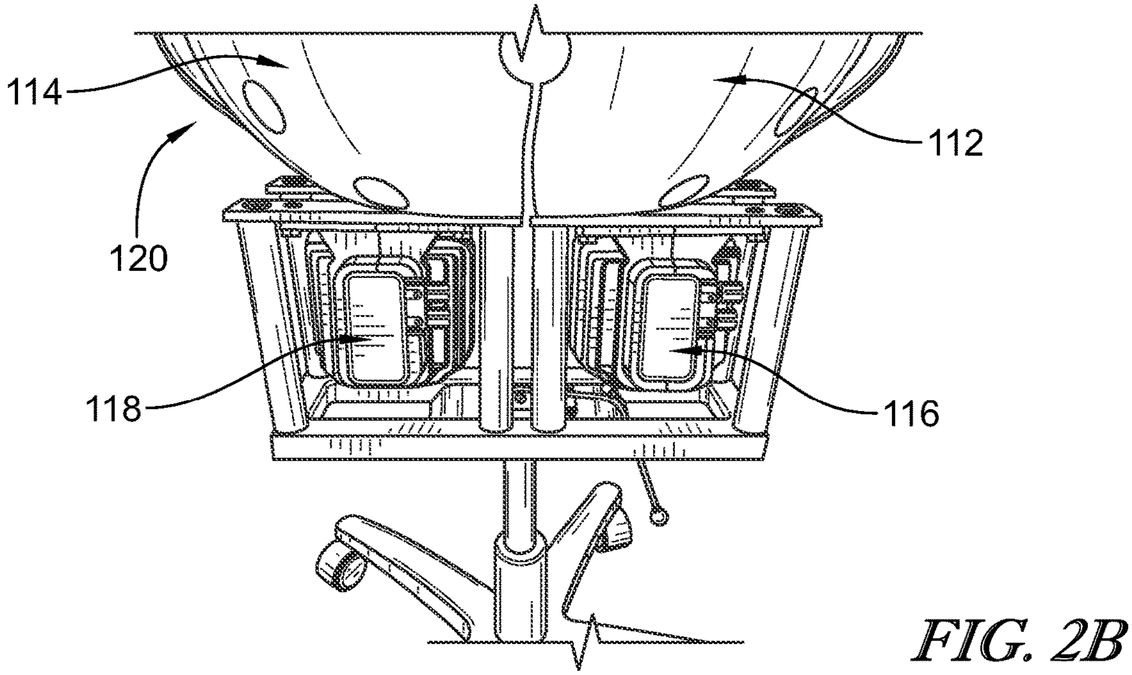
FIG. 2*b* is a posterior view of seat that can be adjusted for height, tilt, and width.

FIG. 2*a* is a posterior view of a seated subject with transducers positioned to transmit maximal vertical displacement vibration into the pelvis through separately controllable units. A subject 210 sits in the conforming, self-centering seat 120 where the snug shaping of the deep pan seat 120 around her lateral thighs and central spine alignment are apparent. The seat is adjustable to the person's habitus such that the deep pan halves conform snugly to the lateral hip margins. As noted above, the raised surface of the middle portion and the raised edge around the outside of the seat aids in centering and alignment. This customization and seat shape may be important to optimal induction of vibration into the body with associated effects. FIG. 2*b* shows a further posterior view of the seat which can be adjust for width as well as tilt angle.

Figure 3:
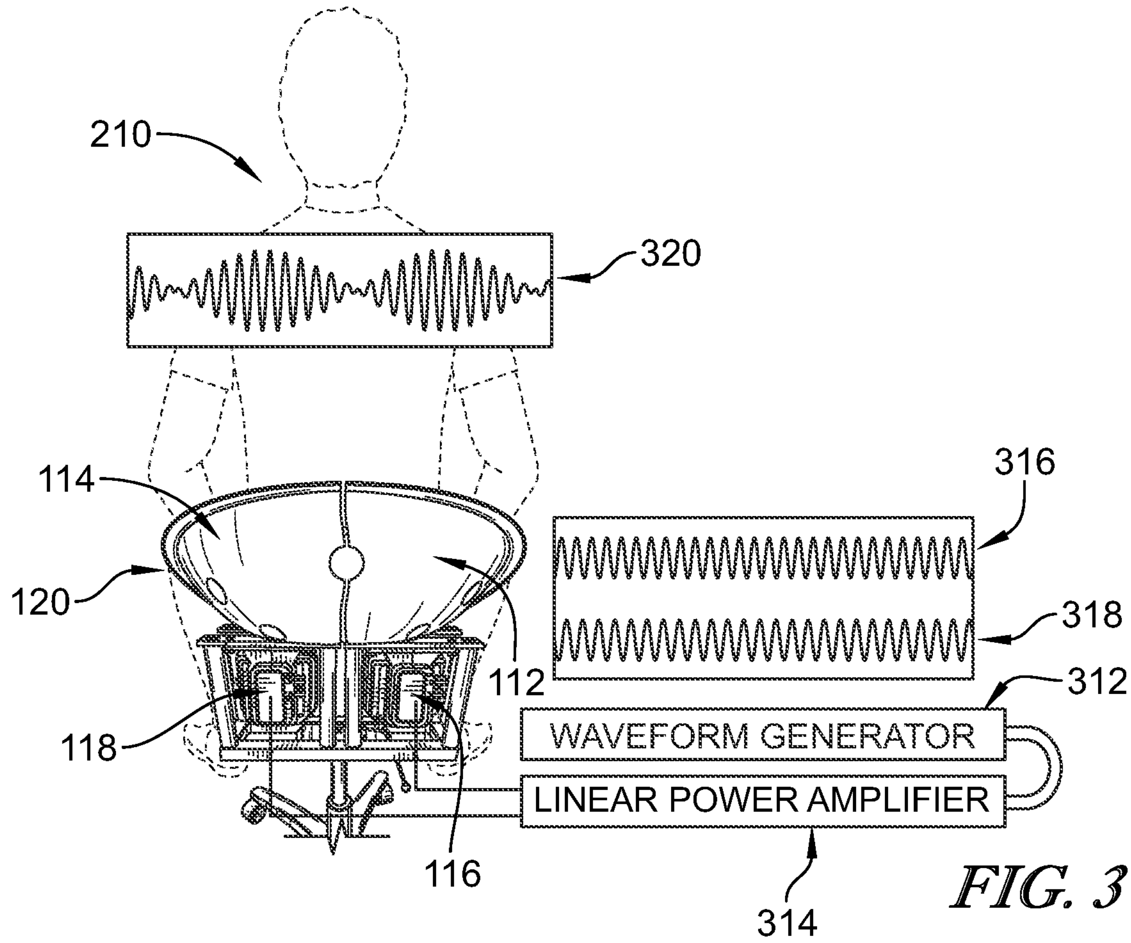
FIG. 3 is a schematic diagram of waveform drive control for each of the transducers.

FIG. 3 is a schematic diagram of waveform drive control for each of the two LFE transducers through two separate programmable function generators. The waveform for each can be changed from sinusoidal to square or triangle or even uniquely shaped. The output voltage is amplified and applied to the LFE transducers such that a maximal induced vibration is about 3 G, but adjustable. Drive frequencies can range between 5 Hz and 250 Hz, but in some implementations more optimally in the range of 15-40 Hz. While sinusoidal waves in the therapeutic range of 45-80 Hz can be induced, in some implementations the more effective method is the employment of square waves in the 15-25 Hz range, resulting in a 3rd harmonic at the 45-80 Hz range induced into the body by each transducer. By offsetting the frequency of the two LFE transducers, e.g. 26.7 and 27.7 Hz, a traveling interferential beat frequency pattern is induced at 1 Hz moving up and down the spine. This beat frequency can be adjusted by difference between the two drive frequencies, typically ranging between 0.1 Hz and 10 Hz, in some implementations optimally 0.5 to 2 Hz.

The system shown is configured to drive asymmetric, independent vibration into each half of the seat and the body. Two programmable function generators 312 may control each LFE transducer (e.g. 116, 118) independently. The programmable generators 312 can create a first drive signal 316 and a second drive signal 318. The first and second drive signals 316, 318 may be sinusoidal, triangular, a rectangular with variable duty cycle at frequencies, or a customized waveform between 5 and 200 Hz to correlate with the range limits of the LFE transducers. The output voltage of the function generators can be adjusted between 0 and 1.5 V, the latter for maximal drive effect. The first and second drive signals 316, 318 may be conditioned (e.g. amplified, strengthened, conditioned, increased in power) by an amplifier 314. Further, the waveform combinations between two simultaneously operating function generators can be sequenced in time to achieve various parameters in the desired frequency range of 45 to 80 Hz. Exemplary function generator may include the Resonant Light Progen II programmable function generators for this purpose (Resonant Light Technology Inc., Courtenay, BC).

Continuing with FIG. 3, the output signal of each programmable function generator passes to stereo inputs of an audio amplifier which accommodates stereo input and outputs. Each signal is amplified in the functional range of 5 Hz to 200 Hz with a maximum of 1500 W out of each channel to each of the two LFE transducers. Exemplary amplifiers may include the Behringer NX3000 amplifier for this operating range (Behringer Amplifiers, MusicTribe Inc., Las Vegas, NV).

FIG. 3 also shows inductor coil pickup sensors affixed to the cylinder casing of each LFE transducer. Since the piston is a magnet, the coil faithfully transduces piston movement to a signal for monitoring of the independent stereo drive patterns. The inventors have had success with the Radio Shack telephone pickup coil (Radio Shack 44533, Fort Worth, TX). The pickup coils are connected to a multichannel sound amplifier with USB interface for real time plotting and tracking of use of the seat. An exemplary analog to digital converter amplifier may include the Focusrite 18i20 analog-digital converter amplifier combination which interfaces to a PC computer (Focusrite Inc, High Wycombe, Great Britain). The signal may be displayed by software rendering in standard oscilloscope tracings as well as surround sound depiction to capture interferential beat effect traversal in the body. An exemplary software may include the Virtins Multi-instrument software for oscilloscope rendering (Virtins Technology, Singapore) and the MasterPinguin Surround Sound software for surround depiction of the body in a coronal plane (Pinguin Ingineurbuero GmBH, Hamburg, Germany). The signals 316, 318 may be super-imposed in the subject 210 to generate a super-imposed signal 320 (e.g. a beat signal) to simulate the spine of the subject 210.

Figure 4:
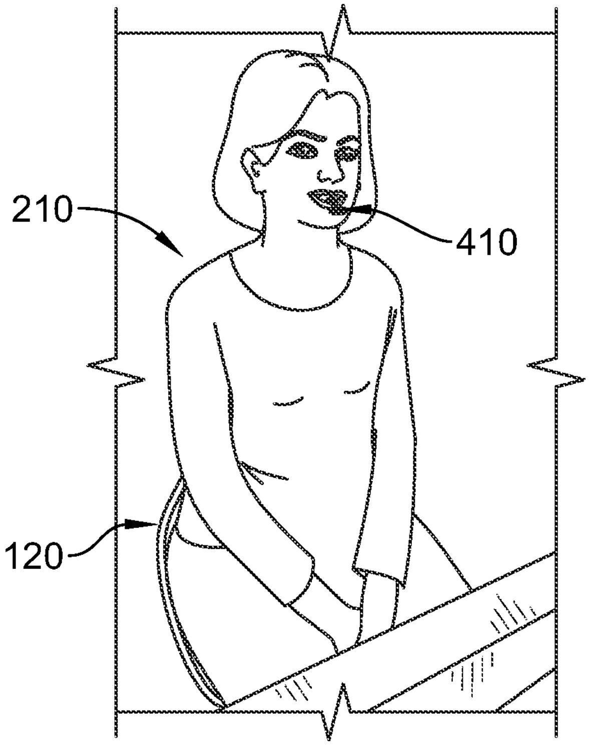
FIG. 4 is a frontal view of a seated patient with a vibration transducer.

FIG. 4 is a frontal view of a seated subject. The subject 210 is positioned into the conformal, dual-vibrating seat 120. In the subject's mouth is a customized mouthguard 410 reversibly affixed to the maxilla. The mouthguard 410 may only fit the subject 210. The inventors have had success with the Nike Impact sports mouthguard which includes an extension for attaching a transducer (Nike Inc, Beaverton, OR). This transducer detects transmitted vibrations of the spine, from pelvis to cranium, as induced by the stereo LFE transducers. It can be of the piezo or accelerometer type, wired or wireless. The inventors have had success with the Peterson acoustic guitar pickup for this purpose (guitar pickup TP-3, Peterson Electro-Musical Products Inc, Alsip, IL). While one implementation may include the sensors (piezo sensors, accelerometers, etc) in a mouth guard, other sensor attachments may be utilized either attached to the subject by adhesive or other wearable, clothing, or harness.

Figure 5A:
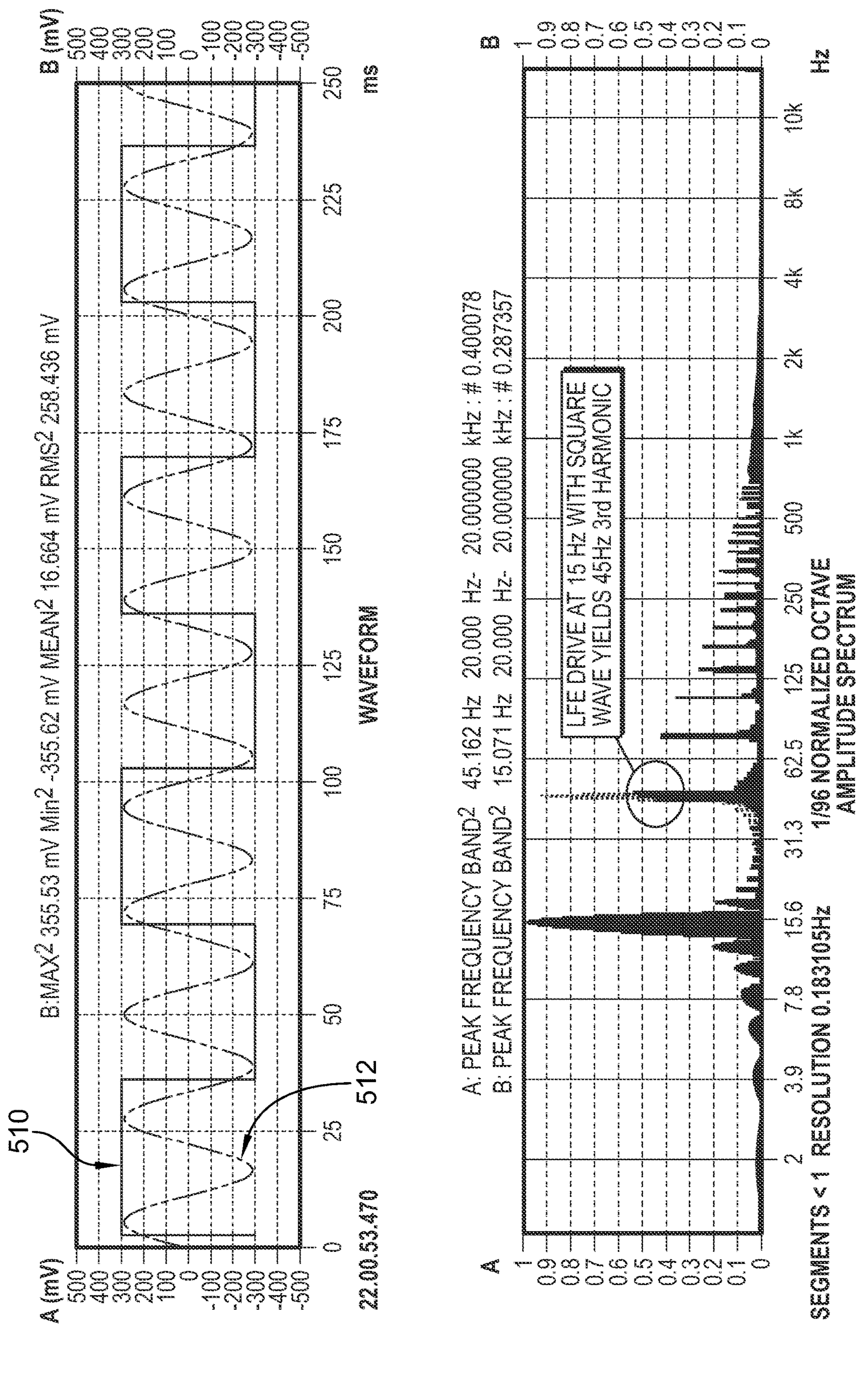
FIG. 5*a* is a real time plot of inductive coil sensors affixed to each of the transducer units.

FIG. 5*a* is a real time plot of inductive coil sensors affixed to each of the transducer units to monitor drive frequency, amplitude, and waveform shape. In this example, the left LFE transducer is driven by a 50% duty cycle rectangular wave to induce 3*g* at 15 Hz and the right LFE transducer is driven at 15 Hz. The plot further shows the fast Fourier transform (FFT) of each tracing which demonstrates the third harmonic at 45-46 Hz range.

A computer software oscilloscope rendering may be used to illustrate a real time plotting of inductive coil pickup voltages from the stereo LFE transducers. While sinusoidal drive in the optimal frequency range of 45-80 Hz range is can be easily induced, the effect is weak. An alternative approach has been showed to be more effective. Each LFE transducer may be driven with a rectangular square wave 510 with 50% duty cycle at a sequenced range between 15 and 26.7 Hz and 16 and 27.7 Hz respectively. Since the square wave is of high quality, the 3rd harmonic of transduced energy may be dominant in a range between 45 and 81 H. The plot in FIG. 5*a* shows the square wave from each of two channels rendered by the audio amplifier, hence with significant overshoot. The FFT plot shows the optimal 3rd harmonic pattern 512 at 45 Hz.

Figure 5B:
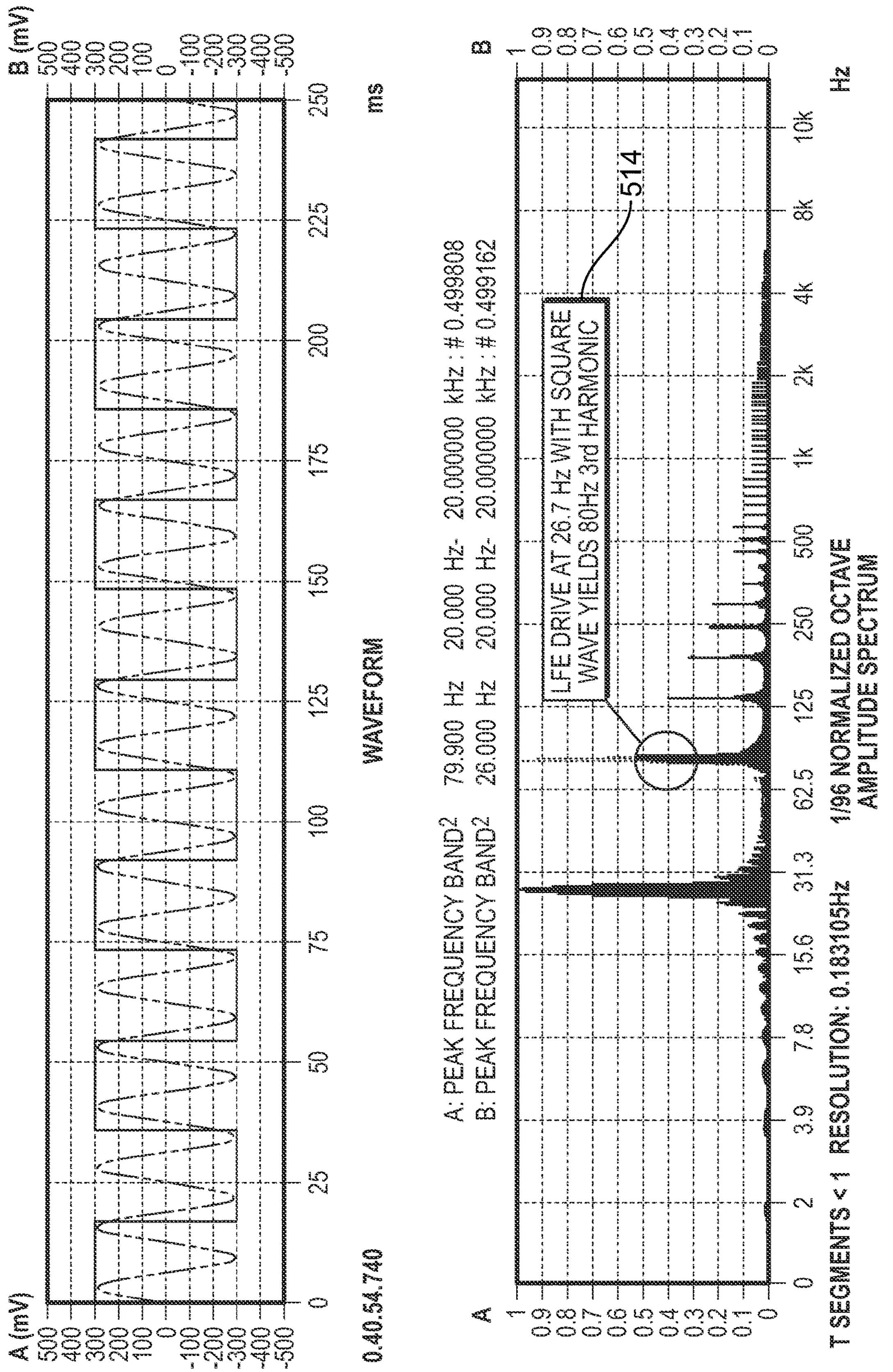
FIG. 5*b* is another real plot of inductive coil sensors affixed to each of the transducer units driven at 26.7 and 27.7 Hz.
Figure 5C:
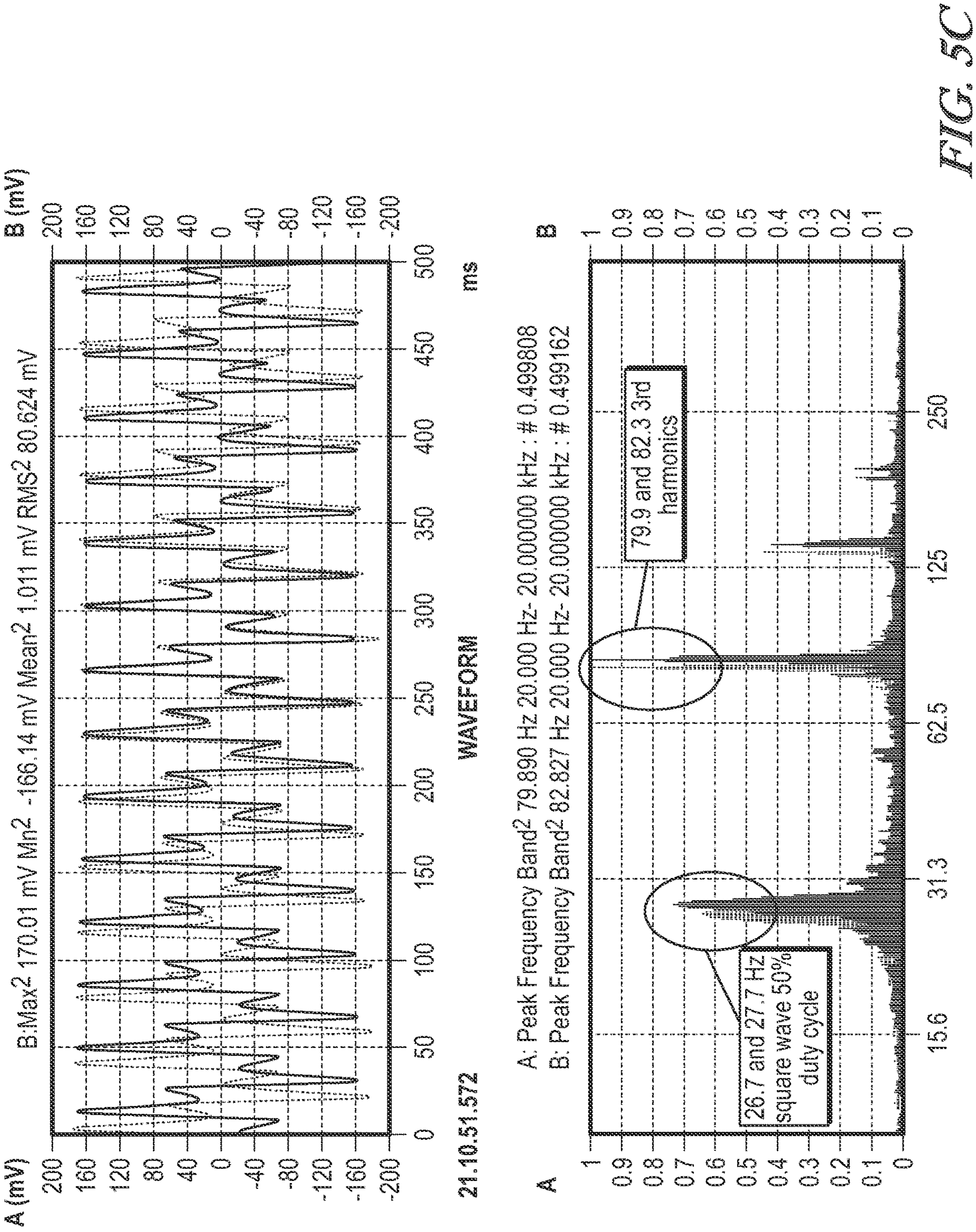
FIG. 5*c* is a plot of an induced frequency in the 45-80 Hz range.

FIG. 5*b* shows the same square waveform driven at 26.7 and 27.7 Hz, resulting in the third harmonic 514 induced into the body at 79-81 Hz range. FIG. 5*c* shows induced frequency in the 45-80 Hz range and may be optimal for relief of symptoms for some implementations.

Figure 5D:
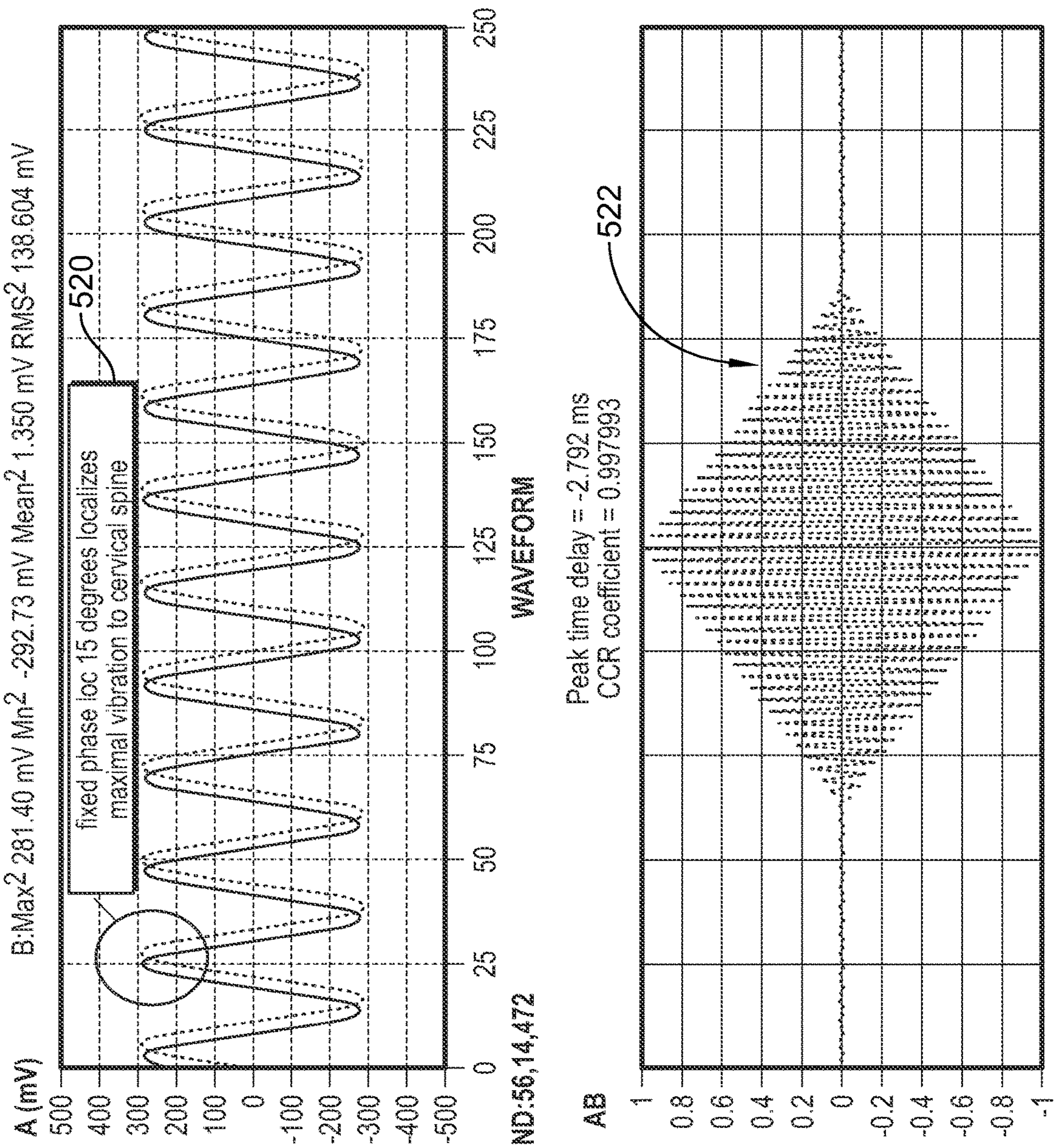
FIG. 5*d* is a plot of a phase lock between the two drive frequencies at 15 degrees.

Driving two stereo amplifiers with an offset frequency, in this instance 1 Hz, results in induced beat frequencies which represent the difference between the two drive frequencies. For example, 26.7 Hz in channel A and 27.7 Hz in channel B induces a sinusoidal 1 Hz beat frequency which consists of the two fundamental drive signals swelling and collapsing in a repeating pattern. When the two signals are fully out of phase, the subject experiences transverse oscillation of the hips in the conformal seat. When the two signals are fully in phase, the subject experiences vertical oscillation and vibration extending into the cervical spine and head. In transition between phases at the beat frequency, the subject experiences a vertical traversing wave with a maximum which can be phase-locked. For example, if maximal cervico-thoracic vibration is desirable, locking of the phase relationship 520 to 15 degrees achieves this. The super-imposed waveform produced 522 is shown in plot 5*d*. FIG. 5*d* shows a phase lock between the two drive frequencies at 15 degrees, resulting in a fixed and nontraveling subjective vibration in the cervico-thoracic spine region.

Figure 6A:
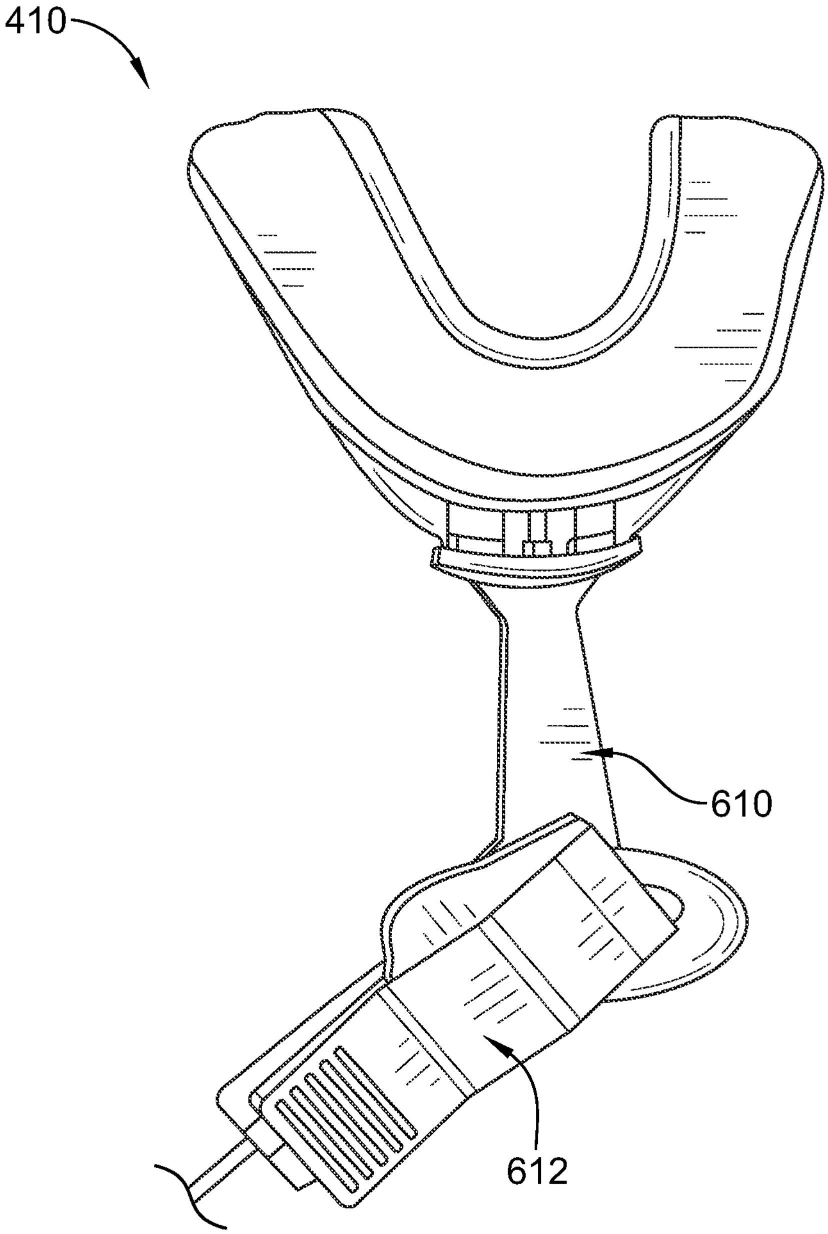
FIG. 6*a* is a perspective view of a customized mouth guard integrating a piezo vibration sensor.

FIG. 6*a* shows a customized mouth guard integrating a piezo vibration sensor. The mouth guard affixes to the subject's maxillary teeth print, enabling transduction of induced vibration and beat frequencies into the cranium. A close-up of the customized mouthguard 410 with integrated piezo sensor is provided. The mouthguard 410 can be individualized to fit snugly to the maxillary teeth. It includes a stem 610 beyond the lips where sensor 612 (e.g. a piezo sensor or an accelometer sensor) is affixed. The sensor may capture the qualitative amplitude of induced frequencies in the body at their drive frequency from the LFE transducers. More particularly, it may capture the interferential beat frequency which is perceived to ascend up the spine from the pelvis to cranium. For example, if the two LFE tranducers are driven at 26.7 and 27.7 Hz, a 1 beat difference interferential beat effect is induced with twice the amplitude of the driving waveforms at peak and zero and lowest point. Additional sensor types can be affixed to the body or engaged by the body to transduce the effect of induced vibration into the body, including piezo, accelerometer and force transducers.

Figure 6B:
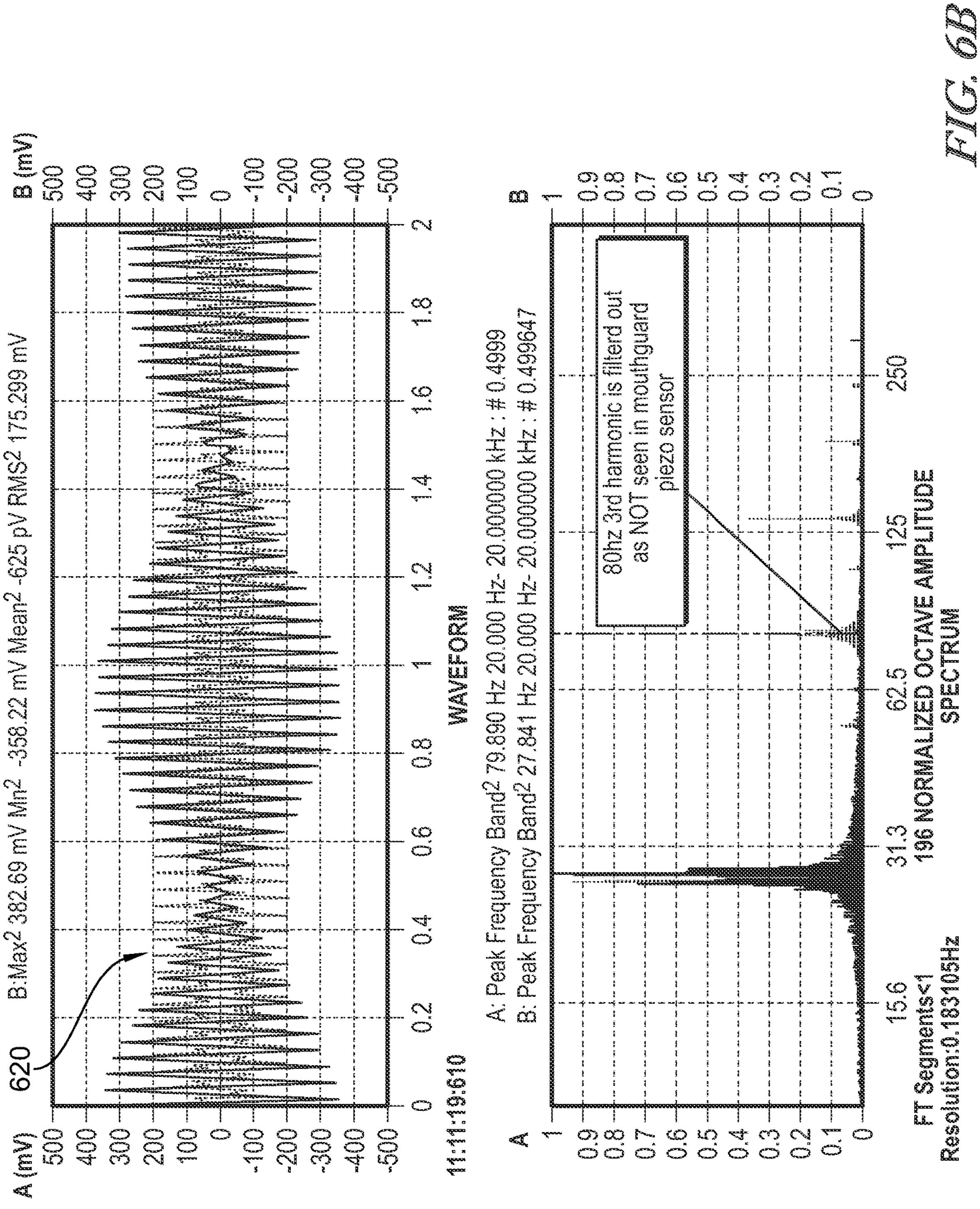
FIG. 6*b* is a real time plot of the vibrational sensor from the mouth guard.

FIG. 6*b* is a real time plot of the vibrational sensor from the mouth guard which quantifies the emergence and subsidence of amplitude of the traveling beat frequency as it moves from pelvis to cranium, varying between near zero and 2×full amplitude of either LFE transducer. The waveform 620 is derived from the mouth guard sensor as amplified through the A/D USB interface and plotted with the oscilloscope software. As such, this mouth guard data can memorialize (e.g. store in memory) a treatment session. For example, if the subject resorts to the stereo vibration seat to gain control over anxiety for a 10 minute session, the datalogging from this sensor demonstrates the engagement of the subject with the system. It becomes a measure of compliance with a regimen to treat withdrawal.

Figure 7:
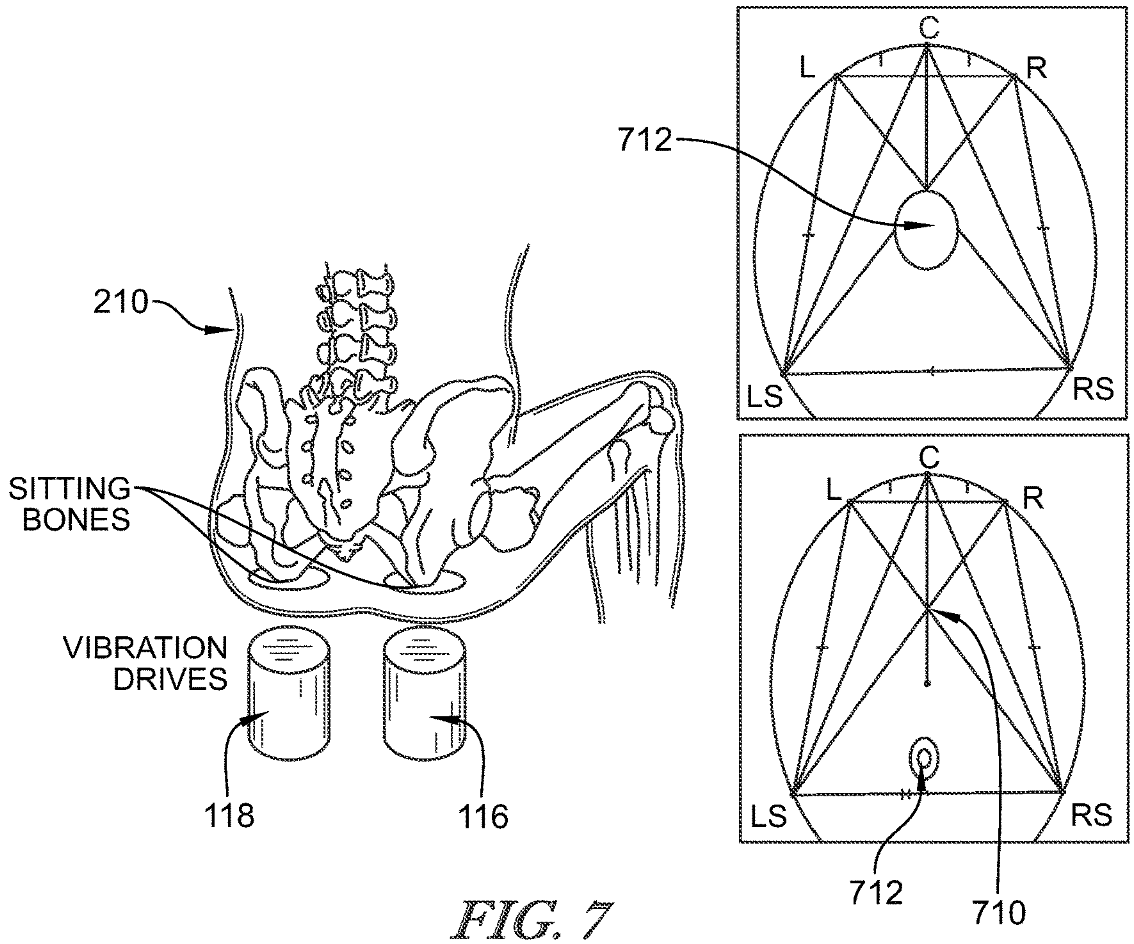
FIG. 7 is a real time plot of mouth guard signal and vibration drive signal.

FIG. 7 is a real time plot of drive sensors against the mouth guard vibrational sensor. The depiction is in the coronal plane of the body where the ball 712 moves up and down the spine as the two LFE transducers traverse from fully in phase to fully out of phase. Out of phase is perceived as bilateral transverse oscillation of the hips where in phase is perceived as vertical oscillation, maximally in the high cervical spine and cranium. The ball size represents amplitude and ball position represents the maxima of induced vibration in the spine.

A software rendering of a surround sound format is employed to depict the location of the maximal vibration as it traverses the spine from pelvis to cranium. Surround sound software allows 3 or more sources of sound in the auditory and infrasonic range to be depicted as a function of independently controlled or measured amplitude and phase. In this instance, the coronal plane of the body is portrayed as rendered in FIG. 1*a*. The vertex or center location 710 of the graph represents the head or mouthguard sensor and the left posterior 8 pm and right posterior 4 pm positions represent the pickup coil sensors for the left and right LFE transducers respectively. As the two drive frequencies differ by a beat frequency offset, for example 26.7 Hz and 27.7 Hz, the phase of the drive frequencies shifts between fully in phase and fully out of phase at that beat frequency rate, for example here at 1 Hz. The ball 712 in the graph enlarges with amplitude and the position between pelvis LFE sensors at out of phase and to cranium at fully in phase correlates with the subjective perception of the traveling vibrational maximum. The programmable function generators as described in FIG. 3 can be set to progress through a sequence of varying drive frequencies and beat frequencies. Subjectively, this is valuable as the person in withdrawal may perceive the spine-traversing vibration as relaxing with slow beat frequencies, e.g. 0.1-0.5 Hz, to alerting or stimulating, e.g. 2-3 Hz and above. Yet further, the phase relationship between LFE drive frequencies can be locked, e.g. held without change, resulting in a perception of a static traversing vibrational wave at a selected spine level. Fully in a locked in phase, maximal vibration is located at the head and cervical spine region with no beat frequency component. Fully out of phase 180 degrees and locked, the subject perceives a transverse oscillation at the level of the hips or pelvis, again with no beat component.

Figure 8:
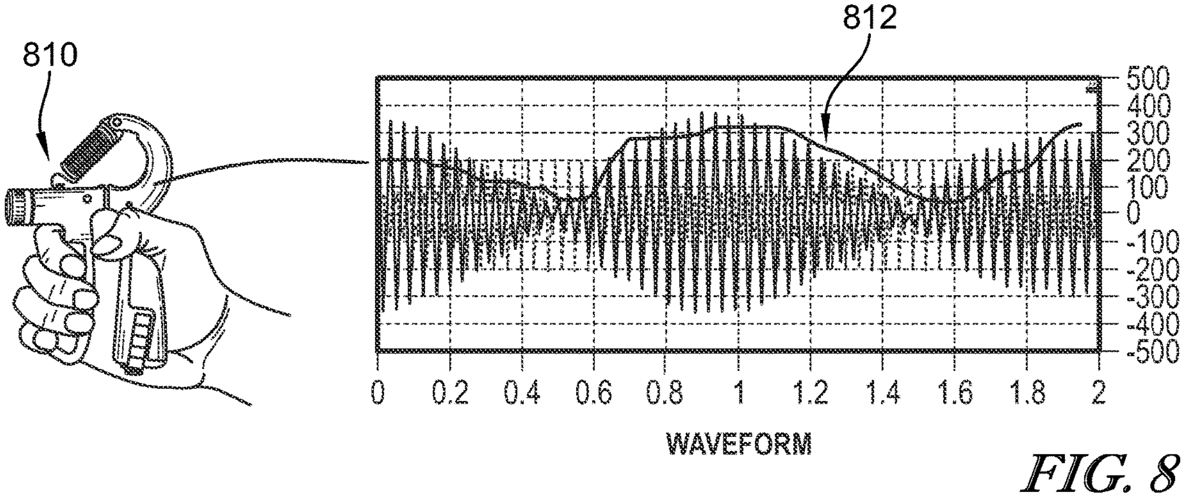
FIG. 8 is a plot of the volitional squeeze by a subject of a piezo force sensor to track induced beat frequencies.

FIG. 8 is a plot of a subject's mouth guard vibrational sensor showing beat frequencies as depicted in FIG. 6. The plot also illustrates the subject's volitional squeeze of a piezo force sensor to track and emulate the peaks and valleys of the induced beat frequencies. The achieved similarity in amplitude waveforms can be quantified or scored by statistical cross-correlation in real time. The piezo force sensor provides a method of further focused engagement of the subject due to interaction with the beat frequency pattern. As showed in FIG. 6*b*, the mouthguard transducer tracks the induced beat frequencies. The subject can be given a force transducer 810 which he can actuate with pressure, for example a hand grip sensor rendering grip compressional strength. The subject can quickly learn through focus to emulate the rise and fall of the beat frequency tracing by squeezing proportional to the sensed and visually rendered beat wave 812. This exercise is highly mentally and physically engaging, depending on the required frequency of emulation tracking and required strength. While aside from the principle interests of this patent, repeated grip compression has been showed beneficial in the nonpharmacologic approach to anxiety and to elevated blood pressure or hypertension (Jorgensen et al., 2018). The inventors have had success with the Vernier Hand Dynamometer (Vernier Software and Technology Inc, Beaverton, OR). The force transducer may be attached elsewhere in the body to track volitional compression which attempts to match the beat frequency minimum to maximum in an interval and isometric exercise including sphincter transducers. Similarly, pelvic floor strength can be substantially enhanced in the treatment of stress incontinence by such repeat exercises tightening on a vaginal-based force transducer (ref Ko et al). One exemplary force transducer includes the Elvie vaginal wireless pressure transducer, (Elvie Inc, London, England). These methods of interval isometric training are thus easily integrated to enhance the therapeutic session on the dual vibration seat and the associated diversional focus also appears therapeutic against anxiety. The figure shows the cumulative tracking of the waveforms using the same oscilloscopic software rendering as described in FIG. 5. A real time cross correlation score of the similarity of waveforms can rank an individual's performance.

Figure 9:
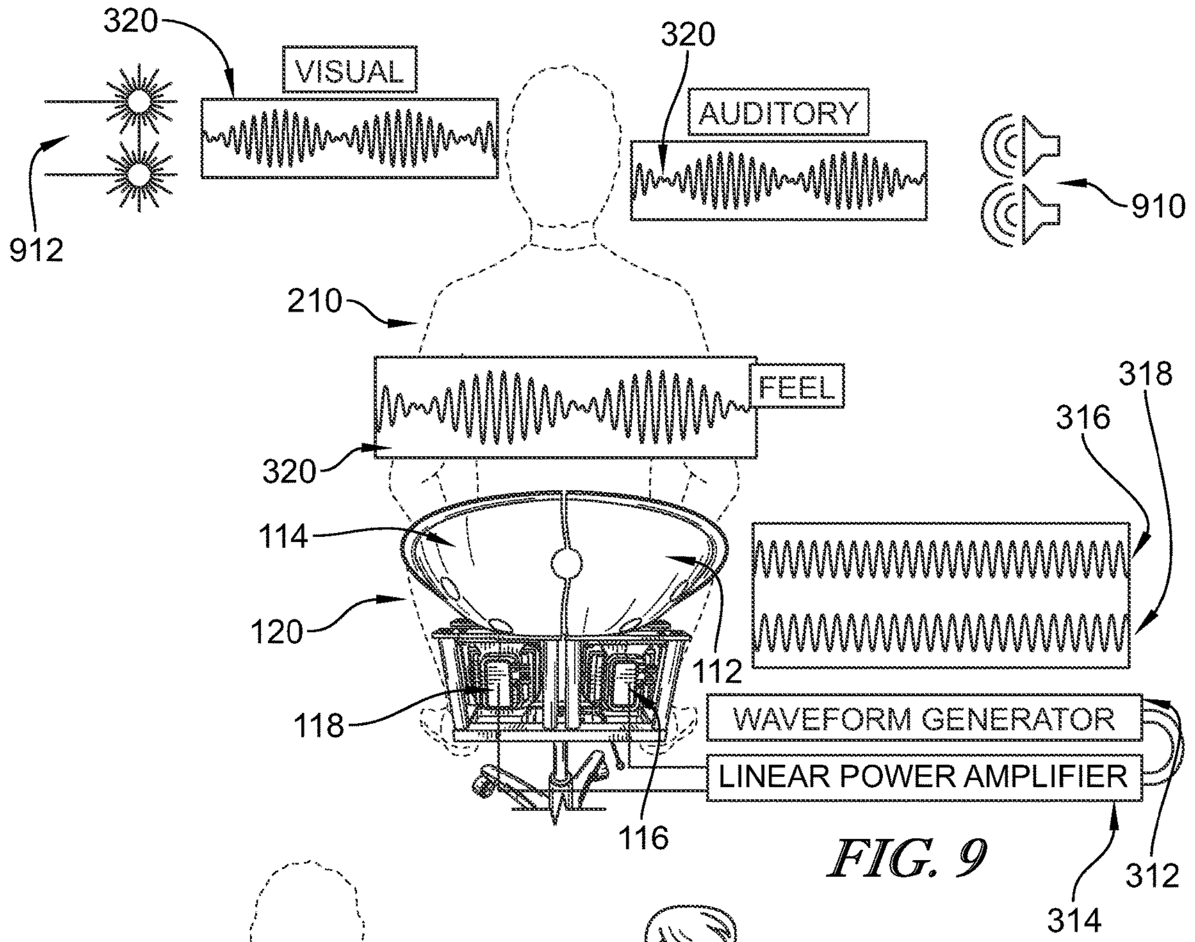
FIG. 9 is a schematic diagram where the tactile mechanoreceptor input into the body has been augmented to include auditory pulse input and visual pulse input.

FIG. 9 is a schematic diagram similar to that seen in FIG. 3, but the tactile mechanoreceptor input into the body has been augmented to include auditory pulse input and visual pulse input. Dual auditory, visual, and sensory input may be provided from the same programmable frequency generators which allows synchronous stimulation of the central nervous system as well as the differential beat effect which is achieved in the driving of separate seat halves. For example, synchronous bilateral or stereo visual and synchronous bilateral or stereo auditory stimulation may be provided.

In FIG. 9, two additional and separate stereo sensory modalities are showed to provide frequency input into the subject's central nervous system beyond the tactile mechanoreceptor input. Programmable frequency generators also drive speakers 910 to generate auditory pulse data in stereo channels left and right at offset frequencies to achieve beat frequency effect. Yet further, the programmable frequency generators may also drive one or more lights 912 (e.g. lasers, LEDs, or other lighting sources) to generate synchronized light pulsing. While this could be easily deployed as an array of light emitting diodes in single or multiple colors, the inventors have had success with amplitude modulation at those drive frequencies of radio frequency excited plasma tubes in both the argon and neon light spectra (argon pulsed electromagnetic field emissions from Resonant Light PERL system, Resonant Light LLC, Courtenay, BC and the neon pulsed electromagnetic field emissions from Frontier Devices LLC, Pelham, AL).

Figure 10:
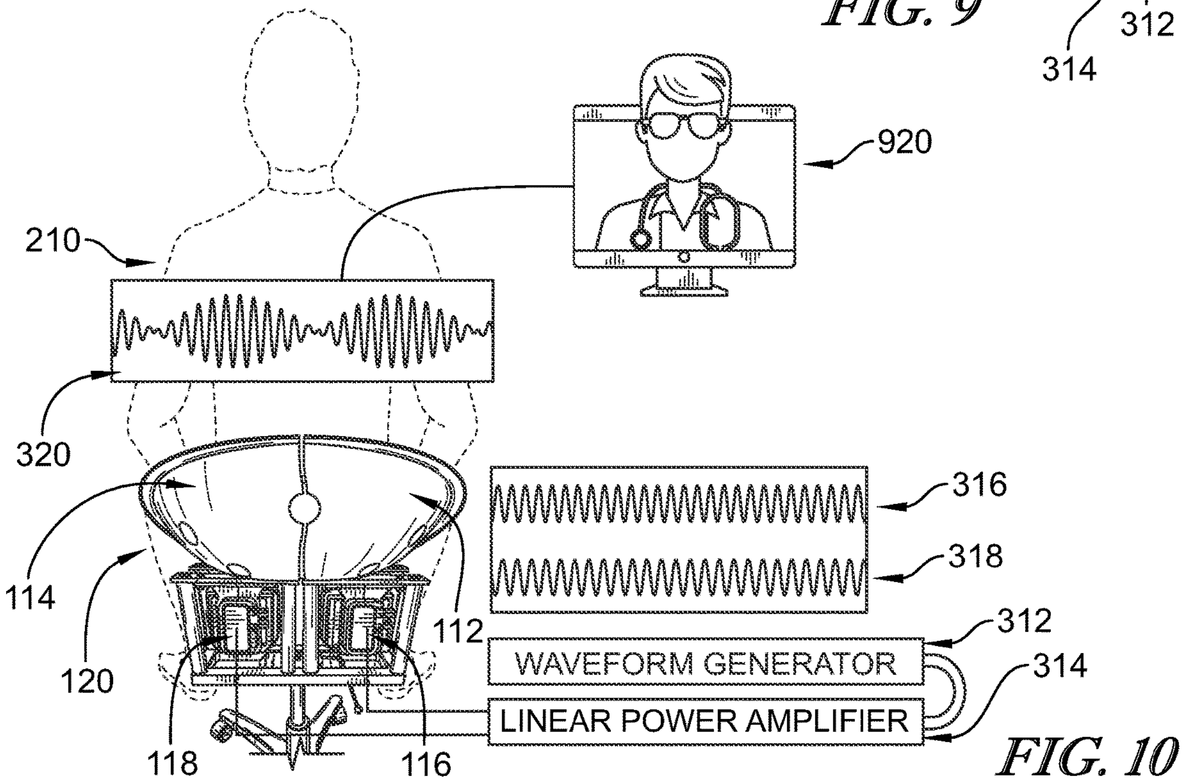
FIG. 10 is a schematic diagram illustrating remote monitoring of the therapeutic session.

FIG. 10 is a schematic diagram illustrating remote monitoring of the therapeutic session which may include duration of use as an indicator of compliance to a treatment regimen. Remote monitoring of the data from the method described in FIGS. 6 and 7 may be provided. It is anticipated that the dual vibrational seat system will be availed most efficaciously in the home environment or in an acute detoxification environment. Documentation of use and compliance with a treatment regimen are essential in this patient population where the re-emergence of drug-seeking behavior is a high risk. The addiction specialist can thus engage through well-established means of telemedicine to optimize chances for successful bridging through the anxiety associated with withdrawal craving. The subject may communicate with a professional through a telecommunication system 920, which may provide video conferencing communication and may transmit measured and generated waveform data from the system to the professional for further analysis and verification. The system may allow the professional to remotely program the parameters for future treatments based on analysis and consultation with the patient. The parameters may be stored as files or within a database 924 connected to the waveform generators. The files or database parameters may be accessed by a controller 922 and scheduled to run on the waveform generator either at the next session, periodically, or on demand. The controller may access, plan, and execute a sequence of waveform parameters to produce a sequence of different perceived waveforms inside the patient. (e.g. sequential traveling beat patterns and/or stationary patterns with different frequencies, intensities, etc. over a period of time).

Alternative, the professional can access the parameters in real time and adjust the parameters while simultaneously monitoring the treatment of the subject. The information recorded for each session may include vibration patterns, duration, and exercises. Additionally, the data collected regarding the vibration parameters may be integrated with other locally transduced or measured sensors known to respond to anxiety or withdrawal including heart rate, blood pressure, heart rate variability, skin DC resistance or impedance, or pupillary size and reactivity. These additional, measurements may be presented with the vibration measurements and may be used to manually or automatically adjust the vibration parameters (e.g. frequency, amplitude, phase, duration and waveform) for the waveform generators.

Modifications to these embodiments by use of alternative transducer and sensor types, methods of subject positioning for optimal engagement of peripheral sensorimotor mechanoreceptor circuits, data gathering and analysis, and co-registration with other biomarkers of anxiety may be familiar to those skilled in the diagnostic and therapeutic science and art of management of withdrawal. All are within the spirit and scope of these claims.

The invention claimed is:

1. A system for introducing vibrational waves into a body of a subject in an upright position, the system comprising:
- a first vibration contact in mechanical communication with a first location of the body of the subject, wherein the first location is a first ischial tuberosity of the subject;
- a first low frequency effect (LFE) transducer connected to the first vibration contact and configured to cause a first vibration at the first vibration contact at or between about 15 and 30 Hz;
- a second vibration contact in mechanical communication with a second location of the body of the subject, wherein the second location is a second ischial tuberosity of the subject;
- a second LFE transducer connected to the second vibration contact and configured to cause a second vibration at or between about 15 and 30 Hz at the second vibration contact, the second vibration having a different frequency than the first vibration resulting in a low frequency traveling wave, having a beat frequency caused by the first vibration and the second vibration differing in frequency by between 0.5 Hz and 2 Hz, within the subject that propagates to the subject's head;
- a sensor in mechanical contact with the subject's head to measure one or more harmonic frequencies observed in the subject's head, the sensor comprises a mouth guard sensor integrated in a mouth guard to measure the one or more harmonic frequencies, wherein the mouth guard is customized to a maxillary tooth print pattern of the subject, the mouth guard sensor is configured to provide a feedback signal to the first LFE transducer or the second LFE transducer in response to the one or more harmonic frequencies.

2. The system of claim 1, wherein the first and second vibration contacts are comprised within a seat, and wherein the seat is a self-centering, conforming seat, divided into first and second sagittal halves and the first and second LFE transducers are affixed to an undersurface of the seat to independently vibrate each of the first and second sagittal halves.

3. The system of claim 1, wherein each of the first and second LFE transducers are coupled to a sensor to convert movement of the first and second LFE transducers into a signal to monitor a drive frequency and a waveform pattern.

4. The system of claim 1, further comprising sensors configured to measure waveform patterns of the first and second vibration contacts, and the mouth guard sensor detects the waveform patterns.

5. The system of claim 4, wherein a software rendering of a surround sound format of the subject's body in a coronal plane is employed to depict the location of the waveform patterns of the sensors on the first and second vibration contacts and the mouth guard sensor to indicate a location of the traveling wave in the subject.

6. The system of claim 1, wherein waveforms elicit dopamine release in the nucleus accumbens of the subject's brain via activation of spinal mechanoreceptors.

7. A system for introducing vibrational waves into a body of a subject, the system comprising:
- a first vibration contact in mechanical communication with a first location of the body of the subject, wherein the first location is a first ischial tuberosity of the subject;
- a first low frequency effect (LFE) transducer connected to the first vibration contact and configured to cause a first vibration at or between about 15 and 30 Hz;
- a second vibration contact in mechanical communication with a second location of the body of the subject, wherein the second location is a second ischial tuberosity of the subject;
- a second LFE transducer connected to the second vibration contact, the second LFE transducer configured to cause a second vibration at or between about 15 and 30 Hz, the second vibration having a different frequency than the first vibration resulting in a traveling wave in the subject, having a beat frequency caused by the first vibration and the second vibration differing in frequency by between 0.5 Hz and 2 Hz, propagated to the subject's head;
- a sensor in mechanical contact with the subject's head to measure one or more harmonic frequencies observed in the subject's head, the sensor comprises a mouth guard sensor integrated in a mouth guard to measure the one or more harmonic frequencies, wherein the mouth guard is customized to a maxillary tooth print pattern of the subject, the mouth guard sensor is configured to provide a feedback signal to the first LFE transducer or the second LFE transducer in response to the one or more harmonic frequencies.

8. The system of claim 7, wherein the first and second vibration contacts are comprised within a seat, and wherein the seat is a self-centering, conforming seat, divided into first and second sagittal halves and the first and second LFE transducers are affixed to an undersurface of the seat to independently vibrate each of the first and second sagittal halves.

9. The system of claim 7, wherein waveforms elicit dopamine release in the nucleus accumbens of the subject's brain via activation of spinal mechanoreceptors.

10. A method for treating anxiety in a subject, the method comprising:
- uprightly positioning a subject on a seat comprising a first vibration contact and a second vibration contact, wherein the subject's first ischial tuberosity is positioned over the first vibration contact and the subject's second ischial tuberosity is positioned over the second vibration contact,
- activating a first vibration source connected to the first vibration contact so that the first vibration source generates a first vibration at or between about 15 and 30 Hz, and
- activating a second vibration source connected to the second vibration contact so that the second vibration source generates a second vibration at or between about 15 and 30 Hz, the second vibration having a frequency different than the first vibration, the first vibration and second vibration differing in frequency by between 0.5 Hz and 2 Hz;

monitoring one or more harmonics frequencies in the subject's head with a sensor in mechanical contact with the subject's head to measure the one or more harmonic frequencies, the sensor comprises a mouth guard sensor integrated in a mouth guard to measure the one or more harmonic frequencies, wherein the mouth guard is customized to a maxillary tooth print pattern of the subject, the mouth guard sensor is configured to provide a feedback signal to the first vibration source or the second vibration source in response to the one or more harmonic frequencies.

11. The method of claim 10, wherein the first vibration and second vibration cause a traveling wave within the subject having a harmonic frequency between about 45 Hz and 90 Hz, the traveling wave propagating longitudinally through the spine to the head of the subject thereby activating spinal mechanoreceptors.

12. The method of claim 10, wherein the subject is in an upright position so that the subject's spine is vertically oriented relative to the first and second vibration contacts.

13. The method of claim 10, wherein a waveform of at least the first vibration or the second vibration has a harmonic frequency of about 80 Hz.

14. The method of claim 10, wherein the seat is a self-centering, conforming seat, divided into first and second sagittal halves and the first and second vibration sources are affixed to an undersurface of the seat to independently vibrate each of the first and second sagittal halves.

15. The method of claim 10, wherein the method further comprises monitoring the frequency of the first and second vibrations with a sensor attached to each of the first and second vibration sources.

16. The method of claim 10, wherein waveforms elicit dopamine release in the nucleus accumbens of the subject's brain via activation of spinal mechanoreceptors.

* * * * *